United States Patent [19]

Varga

[11] Patent Number: 5,169,274

[45] Date of Patent: Dec. 8, 1992

[54] BOBBIN SORTING AND BATCH TRANSFER APPARATUS

[75] Inventor: Andre Varga, Willowdale, Canada

[73] Assignee: Ceeco Machinery Manufacturing Limited, Concord, Canada

[21] Appl. No.: 503,432

[22] Filed: Mar. 30, 1990

[51] Int. Cl.$^5$ ............................................. B65G 1/10
[52] U.S. Cl. ............................ 414/331; 242/35.5 A; 414/276; 414/273; 414/911; 198/720
[58] Field of Search ............... 414/331, 276, 273, 274, 414/275, 397, 911, 222, 528, 501; 198/720; 242/35.5 A

[56] References Cited

U.S. PATENT DOCUMENTS

| | | | |
|---|---|---|---|
| 2,726,753 | 12/1955 | Bee | 414/276 X |
| 2,755,950 | 7/1956 | Forshey | 414/276 X |
| 3,534,850 | 10/1970 | Rogers et al. | 414/276 X |
| 3,895,725 | 7/1975 | Mayer | 414/331 X |
| 4,039,092 | 8/1977 | Schär | 242/35.5 A X |
| 4,615,493 | 10/1986 | Teranishi et al. | 242/35.5 A |
| 4,641,740 | 2/1987 | Grecksch et al. | 242/35.5 A X |
| 4,655,665 | 4/1987 | Lattion | 242/35.5 A X |
| 4,702,427 | 10/1987 | Raasch | 242/35.5 A |

FOREIGN PATENT DOCUMENTS

| | | | |
|---|---|---|---|
| 1113839 | 5/1986 | Japan | 242/35.5 A |
| 62613 | 3/1949 | Netherlands | 414/276 |

*Primary Examiner*—Frank E. Werner
*Attorney, Agent, or Firm*—Lackenbach, Siegel, Marzullo, Aronson & Greenspan; Marzullo Aronson; Myron Greenspan

[57] ABSTRACT

This invention relates to a bobbin sorting and batch transfer apparatus which can collect a predetermined number of bobbins from vertically stacked storage racks each of which has a discharge port. A carriage is provided on which there are mounted one or more guide elements including vertical guides which can be juxtaposed proximate to the discharge ports. A chain drive bearing rollers is arranged to form holding bins or compartments which can be advanced in a planetary motion along the various guides. The rollers are spaced from the vertical guides to maintain the bobbins in equilibrium by arranging same to roll against the vertical guides, the rollers urging the bobbins to move through a closed loop path which can position any holding bin or compartment into proximate opposition to any discharge port in a given column of racks. Gates on the racks selectively release a bobbin wound with wires having specified characteristics into the selected bin or compartment, the chain drive being reversible to minimize distance traveled by any given bin or compartment to a discharge port. An ejection member is provided for ejecting all of the bobbins loaded onto the apparatus in a desired sequence independently of the manner or order in which the bobbins are initially placed into the holding bins or compartments.

21 Claims, 4 Drawing Sheets

BOBBIN SORTING AND BATCH TRANSFER APPARATUS

BACKGROUND OF THE INVENTION

1. Field Of The Invention

The invention generally relates to cable manufacturing machinery, and more specifically to a bobbin sorting apparatus for collecting bobbins having different specified wires and dispensing them in a desired order or sequence for further processing, such as by cabling machines or group twinners.

2. Description Of The Prior Art

Communication cables are composite cables typically formed of many twisted wire pairs each of which may have its own specified physical and electrical properties. Thus, wire pairs may differ in the gauges of the wires, the pitch at which the wires are twisted and the coded colors of the insulations of the wires so that they can be readily identified by those that install or service the cables. In North America, for example, a typical long distance communication cable may include 25 twisted pairs although in Europe 10 twisted pair cables are more common. Thus, for example, as many as 50 color selections may be required during the assembly of the cable, some colors of which may be duplicated or repeated in different wire pairs. Bobbins of a particular color, gauge, etc. are normally stored in the same rack compartments at a storage or input location. If there are 25 color codes, the rack may have 25 different compartments. Such compartments may be located either along a single horizontal level or may be stored in multiple vertical columns Ten different colors may, therefore, be stored in two vertical racks of 5 compartments or bins aligned in vertical columns above each other.

The process of twinning which forms the individual twisted pairs has typically been an independent one which is performed after the differently colored insulating layers have been extruded onto the wires, but before stranding of all of the individual wire pairs using double twist machines. While the lays of the twisted pairs can be controlled by regulating the speeds of rotations of the individual double twist machines, the other aspects of the twisted pairs including the selections of wire gauges and insulation colors has presented considerable difficulties. Normally, the bobbins wound with different wires having different gauge sizes and color insulations are maintained in storage racks which are continually supplied with such bobbins, frequently from an extruding station which is located upstream of the line. As the bobbins are wound with wire having specified properties, they are transferred to the storage bins, from which they must be selectively delivered to the gang or group twinners for the twinning and subsequent stranding operations. Gang or group twinners for manufacturing communication cables are produced by various companies. Such twinners may be ganged in any number of units. In order to decrease down time and maximize the efficiency of the twinning operations, it is extremely important to use a reel handling system which can quickly and easily select bobbins having the desired wire characteristics from the storage bins and deliver them to the appropriate twinners so that the proper twisted pairs can be made. Numerous loading systems of this type have been proposed, ranging from fully robotic to manual systems.

In some common installations, the units are fed from a floor conveyor system which moves the reels to the correct positions for loading. The conveyor is fed either manually or from an existing material handling system. Manual procedures can be automated by means of programmed packages which utilize computers in conjunction with the conveyer systems.

While sophisticated approaches have been proposed for collecting different bobbins from storage bins and loading them onto specified twinners, the proposed solutions continue to suffer serious disadvantages and are normally not cost effective.

In one proposed system, a fully automatic robot take-up is programmed to travel along tracks between the various storage bins and the individual twinners. The robot is programmed to remove a reel from a storage bin and place it at a desired location, such as a storage shelf, reel carriage or on the floor beside the twinning machine. However, the robot moving speed is approximately 30 meters per minute, and the robot lifting speed is approximately 10 meters per minute. Since the robot is designed to select and transport only one bobbin at a time, it is clear that the operation of replacing many bobbins can be extremely slow. Any delays in the bobbin sorting and transfer operations, of course, translate into increased down time for the machines and a drop in efficiency in terms of product output A system of the type aforementioned is sold by Nokia of Helsinki, Finland and the system is described in Catalog No. 11.00 published in 1976. A somewhat similar system is disclosed in U.S. Pat. No. 4,610,404, which discloses a robot device for the loading of empty spools and unloading of full spools into and from winding machines aligned in a single file on one side of a track. A carriage is provided which moves along the track and stops at the machine to be served. However, the robot device, again, is designed to replace only one bobbin at a time and this renders the robot device inefficient.

In U.S. Pat. No. 4,076,132, a bobbin transporting and storage system is disclosed which is intended to move loaded bobbins from extruders to storage racks. Bobbins having wires of similar characteristics are loaded onto chutes and simultaneously ejected onto an appropriate storage rack intended for those bobbins. The bobbins, however, are individually manually removed at the outlet ends of the storage racks and placed on a conveyer for further processing. The manual operation of removing individual bobbins from the racks is, as with the previously discussed systems, slow and reduces the efficiency of the line.

In U.S. Pat. No. 4,071,150, a system is disclosed for supplying conductors for a communication capable making apparatus. Here, bobbins are manually arranged on storage racks each slated to receive a particular wire pair. Twenty-five such storage racks are arranged in each of four horizontal rows stacked one above the other, and an elevator is used to simultaneously remove 25 bobbins from each row. The elevator brings the bobbins to the ground level and ejects them onto a conveyor at which time all 25 bobbins are removed to a stranding station. The bobbins, therefore, are pre-arranged on the individual racks and there is no selectivity during removal of the bobbins since all 25 bobbins in one row are simultaneously deposited onto the elevator, and the order in which they are placed on the elevator is the same order in which they are conveyed once ejected.

In U.S. Pat. No. 4,655,665, there is described a bobbin magazine used in conjunction with a yarn processing machine. The magazine is in the nature of a vertical conveyer which supports compartment-defining elements secured to the conveyer band. The magazine is manually loaded with stacks of fresh bobbin tubes and a door is provided to the enclosure which houses the conveyer which can be opened to provide access to the various compartments to insert a stick of tubes. All of the tubes are generally identical and there is no sorting involved, the advantage of the device being that there is substantially a doubling of a number of compartments within a given length of conveyer, since the compartments are formed on both sides of the conveyer. Since all of the bobbin tubes are essentially identical, there is no requirement for reversal of the conveyer drive direction in order to more quickly access specified compartments to be loaded with specific bobbins.

The prior art systems have failed to provide the flexibility or versatility of rapid random selection or arrangement of bobbins on storage racks or removal of bobbins from such racks for arrangement of a predetermined number of bobbins having specified electrical and/or other characteristics in a desired order or sequence.

SUMMARY OF THE INVENTION

It is, accordingly, an object of the present invention to provide a bobbin sorting and batch transfer apparatus which does not have the disadvantages inherent in prior devices.

It is another object to provide an apparatus of the type under discussion which is simple in construction and economical to manufacture.

It is still another object of the invention to provide an apparatus as in the previous objects which is flexible or versatile and can be used to sort and batch transfer a plurality of bobbins between remote stations.

It is yet an object of the present invention to provide a bobbin sorting and batch transfer apparatus which can be used to selectively load bobbins onto a plurality of storage racks and to randomly select bobbins wound with wires having specified characteristics from a plurality of storage racks for batch transfer and discharge at a remote station in a desired sequence.

It is a further object of the invention to provide a sorting and transfer apparatus which can be manually operated or fully automated.

It is yet a further object of the invention to provide a sorting and transfer apparatus which can selectively load one or more bobbins from one of a plurality of storage racks and arrange all the bobbins, whether similar or different, in a predetermined desired sequence so that they can be ejected at a remote station in the sequence in which the bobbins are arranged on the transfer or transport apparatus.

It is yet a further object of the present invention to provide a bobbin sorting and batch transfer apparatus which can be used in conjunction with wire twinning, stranding and cabling equipment.

It is an additional object of the present invention to provide a bobbin batch transfer apparatus which can be programmed to minimize the time taken to select a plurality of bobbins from storage trays and arranging these in a predetermined or desired order or sequence so that banks of machines downstream of the processing line can be supplied in ordered batches or groups of bobbins thereby minimizing down time and increasing efficiency of the line.

In order to achieve the above objects, as well as others which will become apparent hereafter, the present invention relates to a bobbin sorting and batch transfer apparatus for collecting a predetermined number of bobbins from a loading station having a plurality of storage locations each containing bobbins wound with wires having specified characteristics and each having a discharge port. The apparatus also serves to discharge the collective bobbins in a predetermined sequence at an unloading station remote from the loading station. The apparatus comprises carriage means for moving between loading and unloading stations. A plurality of serially arranged bobbin holding means $1 \ldots n$ are mounted on said carriage means for movement along a path which registers with and is proximate to at least a number of storage locations when said carriage means is at the loading station. Gate means is provided for enabling a bobbin stored in a storage location to be moved to a selected holding means $n_i$ in registration therewith. Control means is provided for selectively positioning any bobbin holding means $n_i$ in registration with a desired discharge port to thereby permit up to n bobbins in any combination to be independently sorted and loaded onto the apparatus in any desired order. Means provided for sequentially ejecting a batch of bobbins from said holding means $1 \ldots n$ in this manner, a batch of up to n bobbins can be dispensed in a desired sequence corresponding to the serial relationship of said holding means $1 \ldots n$ independently of the manner in which the bobbins are initially placed into the individual ones of said holding means.

BRIEF DESCRIPTION OF THE DRAWINGS

Other objects, features, and advantages of the invention will appear from a detailed description of the preferred embodiments that follow, taken in conjunction with the drawings in which.

DESCRIPTION OF THE PREFERRED EMBODIMENTS

Figures 1, 2:
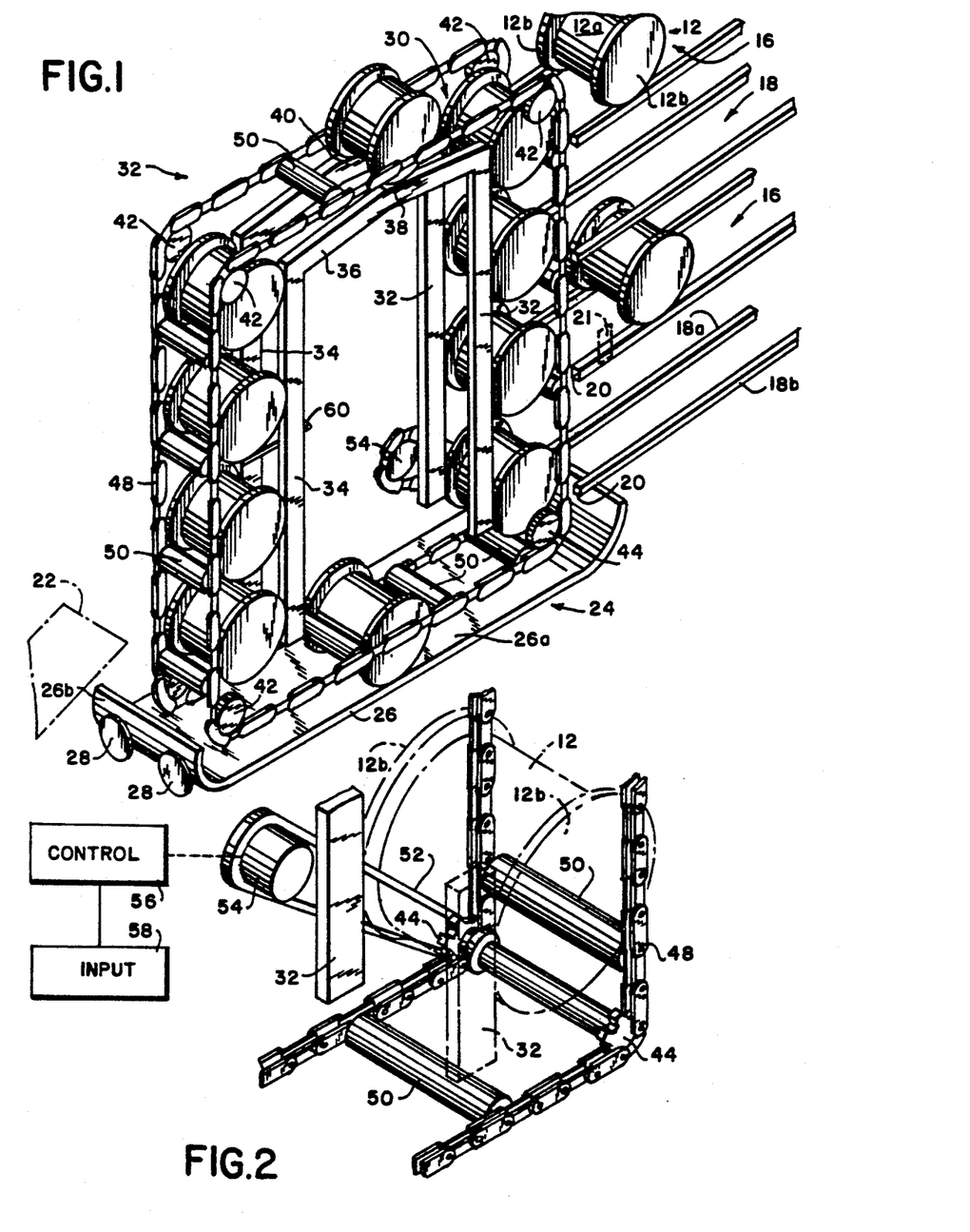
FIG. 1 is a perspective view of a bobbin sorting and batch transfer apparatus in accordance with the present invention, wherein the bobbin receiving compartments are arranged in a planetary configuration.
FIG. 2 is an enlarged portion of the apparatus shown in FIG. 1, showing the details of the sprocket chain drive arrangement for driving rollers which control the movements of the bobbins.

Referring now specifically to the figures, in which identical or similar parts are designated throughout, and first referring to FIGS. 1 and 2, a bobbin sorting and batch transfer apparatus in accordance with the invention is generally designated by the reference numeral 10. The device or apparatus 10 is intended, as will be described below, to collect a predetermined number of bobbins 12 from a loading station 14 having a plurality of storage locations 18 in the nature of shelves or racks 18 each containing bobbins wound with wires having specified characteristics and each having a discharge port 20.

The bobbins 12 are of conventional design and include a central portion 12a on which the wire is wound, and flanges 12b which have predetermined diameters and which can be used to roll the bobbin about their axes, as is common in the art. Thus, while the racks 18 may be solid shelves or other surfaces, they are advantageously in the form of angle irons which provide support and rolling surfaces for the flanges 12b. The racks 18 are shown aligned in vertical rows and inclined downwardly in the direction of the device 10, discharge ports 20 being defined at the lowest points of the racks where the bobbins have a tendency to roll under the action of gravity. To prevent the bobbins from inadvertently or unintentionally moving off the racks, suitable gates 21 are provided in proximity to the discharge ports 20. The specific construction of the gates 21 is not critical and any suitable gates may be used for this purpose. The gates 21 may be manually actuatable. However, they may also be electronically actuated, so that they can be remotely controlled to selectively release a bobbin 12 from any given rack. Although only four vertical racks are shown in FIG. 1, it should be evident that the number of racks vertically stacked in this manner is not critical and more than four racks may be used. Generally, each rack contains bobbins 12 wound with wires having specified characteristics, such as specific wire gauges and insulations of different color codings.

The device or apparatus 10 is intended to collect bobbins from the racks 18 as to be described below, and discharging the collected bobbins 12 in a predetermined sequence at an unloading station 22 remote from the loading station 14. However, it will become evident to those skilled in the art that the apparatus 10 may also be used in a reverse operation to load randomly arranged bobbins on the apparatus onto a plurality of specified storage racks or shelves. In FIG. 1, the unloading station is shown in phantom outline as a chute or discharge rack or trough, although the specific handling equipment at the discharge station is not critical so long as all of the bobbins 12 can be batch discharged in a predetermined sequence at the remote station. Towards this end, the apparatus 10 includes a carriage or trolley 24 which is movable between the loading and unloading stations 14, 22 respectively.

The carriage 24 includes a body 26 which in the embodiment of FIG. 1 includes a generally horizontal and flat support platform 26a and upwardly turned portions 26b at each end proximate to the loading and unloading stations 14,22 when the carriage 24 is proximate to those stations. The body 26 is mounted on wheels 28 for transporting the carriage between the respective loading and unloading stations. Any method for moving the trolley, however, can be used, such as wheels for movement on tracks, conveyers or guideways along the ground.

An important feature of the present invention is the provision of a plurality of serially arranged bobbin holding means 1 . . . n, generally designated by the reference numeral 30, which are mounted or provided on the carriage 24 for movement along a path which registers with and is proximate to at least a number of the storage locations 16 when the carriage 24 is at the loading station 14. In all of the presently preferred embodiments to be described, the path is a closed loop path, although it is also possible to utilize the invention by using a non-loop path. The bobbin holding means generally defines a bin or compartment within which a bobbin can be received and maintained n a stable condition and ejected therefrom as desired. The compartments 30 are movable past the discharge ports 20 of the various racks 18 and, when empty, are available for accepting bobbins from the racks. The gates 21 determine which bobbins from which racks can be loaded into a given compartment 30. An important feature of the invention is that the bobbins, which can initially be placed on any of the racks 18, can be moved to any selected compartment 30 when that compartment is juxtaposed opposite the respective rack and discharge port thereof by the actuation of the associated gate 21.

In the embodiment shown on FIGS. 1 and 2, the compartments 30 are arranged in a planetary configuration, where compartments 30 are spaced from each other along the closed loop path a distance which substantially corresponds to the vertical spacing between the discharge ports 20. In this way, the alignment of the compartments 30 with one discharge port 20 in one vertical column causes all of the compartments 30 in opposition to the various racks 18 to be aligned with the discharge ports in that column. The planetary movement of the bobbins 12 is determined by a number of guides, more fully described below, which form or define the closed loop path in a generally vertical plane as shown. The bobbins 12 are placed in the compartments 30 abutting against and rolling on such guides as the bobbins move along the closed loop path. The compartments 30 include suitable bobbin support elements, to be described, for maintaining the bobbins received within the compartments spaced from each other along the closed loop path a predetermined distance from each other.

In the embodiment shown in FIG. 1, the guides for forming the closed loop path include two vertical guides 32,34 spaced from each other in the vertical pane, inclined guides 36,38 extending upwardly from each vertical guide 34,32, respectively, and meeting substantially midway between the vertical guides at a peak 40 to bridge the same and provide an initial gradual incline and subsequently a gradual decline for a bobbin when moving from one vertical guide to the other vertical guide. The body 26, including the lower horizontal platform 26a and the upwardly turned end portions 26b form a lower guide which is spaced below the vertical guides 32,34. As with the racks 18, the guides 32,34,36,38 may present solid or continuous surfaces, like the lower platform 26a. However, it is sufficient to merely form each of these guides as a pair of rails which are spaced and arranged to provide rolling surfaces for the flanges 12b of the bobbins. Thus, although a single guide is sometimes referred to herein, such single guide may consist of two spaced rails, such as the guides 32 and 34 in FIG. 1.

A suitable drive is provided for moving the bobbins about the closed loop path. In FIG. 1, four pairs or sets of spaced sprockets are provided and vertically aligned as shown, three pairs of sprockets 42 being idle sprockets, while one pair of sprockets 44 being driven sprockets about a shaft 46 (FIG. 2). The sprockets are arranged about the closed loop path to configure a double chain drive 48 into four portions including two substantially vertical chain portions and two horizontal chain portions as shown, the vertical chain portions being spaced from associated vertical guides 32,34, while the horizontal chain portions being above and proximate to the inclined guides 36,38 and the lower guide or surface 26a.

Figure 3:
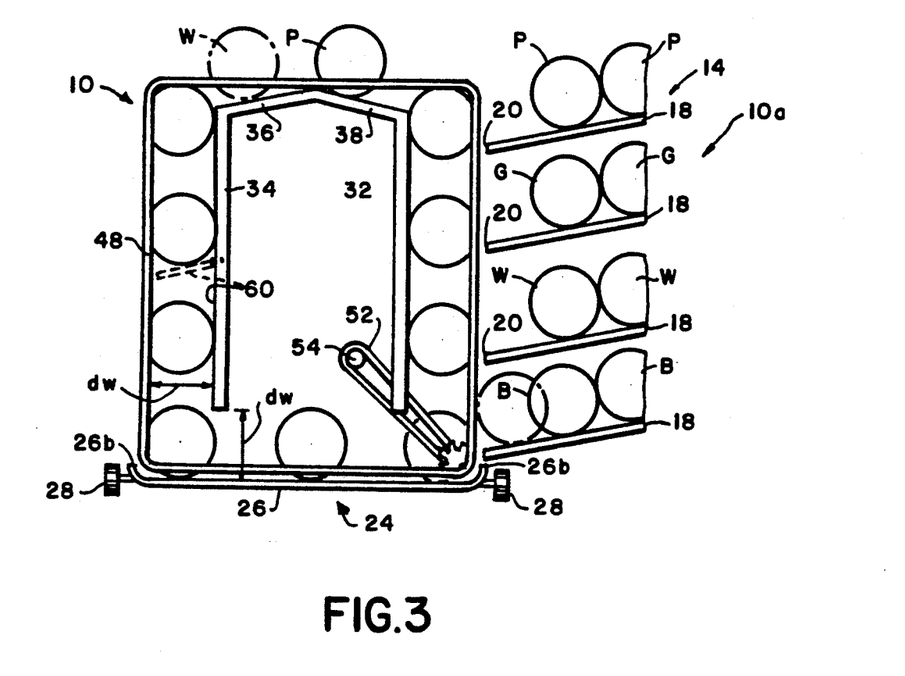
FIG. 3 is a side elevational view, in schematic of the embodiment shown in FIG. 1, showing one condition during the sorting and loading of the apparatus.

Referring to FIG. 3, the spacing between the vertical guides 32,34 and the lower guide or surface 26a, designated by the reference $d_h$ is sufficient to permit bobbins 12 to move on the lower guide or surface 26a below the vertical guides 32,34 as the bobbins 12 move along the closed loop path.

Bobbins support means in the nature of rollers 50 are mounted on the double chain drive 48 for maintaining the bobbins within the compartments 30 and are spaced from each other along the closed loop path at minimum distances from each other to prevent bobbins from making contact with each other while they are guided along the closed loop path.

Suitable controls can be used for advancing the rollers 50 along the closed loop path and urging the bobbins within the compartments 30 to follow the closed loop path. Such controls may include a suitable belt or chain drive 52 which is driven by a motor 54, as shown in FIG. 2. The motor itself may be operated by a controller 56, which may be manual or electronic. A suitable input device 58 interfaces with the controller 56. Thus, where the controller 56 is a manual one, an input interface 58 may be in the nature of push buttons or knobs which can select the movements of the motor 54 and, therefore, of the rollers 50. The controller 56 can also contain controls for moving the carriage 24 along its tracks or other components or elements to be described in connection with other embodiments of the invention, such as the gates 21. The controller 56 may also be used to operate an ejector plate 60, to be discussed below. Where the device or apparatus 10 is to be fully automated, the controller 56 can incorporate microprocessor control, while the input 58 may represent a keyboard for inputting data to the controller 56 or a computer, if one is to be used.

Referring to particularly to FIG. 1, it will be clear that the guides 32,34,36,38 and body 26 are configurated to insure that the bobbins 12 always roll against at least one of the guides and a roller. The rollers 50 urge the bobbins to roll on their flanges as they proceed along the closed loop path rolling on the various guide surfaces.

With the arrangement as shown, the vertical chain portions are spaced from the vertical guides 32,34 a distance to insure that the bobbins 12 which are supported by the rollers opposite the vertical guides are stable and urged by the rollers 50 to roll against the vertical guides 32, 34. The rollers cannot, therefore, be spaced a distance from the vertical guides greater than the diameter of the flanges 12b. However, they cannot be spaced from the vertical guides 32,34 a distance equal to or less than one-half of the diameter of the flanges 12b since that may change the equilibrium of the bobbins and instead of insuring that the bobbins roll against the vertical guides, the bobbins may inadvertently move off the rollers 50 and out of the compartments or bins 30. The centers of gravities of the bobbins, therefore, should be located between the vertical guides 32,34 and the rollers 50 along the vertical portions of the path. Along the inclined guides 36,38 and along the body 26, the bobbins are not supported by the rollers but by the guide surfaces themselves, and the rollers only serve to move the bobbins along. The height of the rollers, therefore, is not critical.

Referring to FIGS. 1-4, it will be clear that the compartments or holding bins 30 may be selectively positioned in registration with a desired discharge port 20. Up to n bobbins in any combination may be independently sorted and loaded onto the device or apparatus 22. The maximum number of bobbins n is equal to the number of compartments or holding bins 30. In the embodiment shown, ten such bins are used, although the specific number is not critical and any number may be used as required. Thus, the holding bins or compartments 30 can be selectively positioned in registration with a desired discharge port 20 to thereby permit up to n bobbins in any combination to be independently sorted and loaded onto the apparatus 10 in any desired order.

Figure 4:
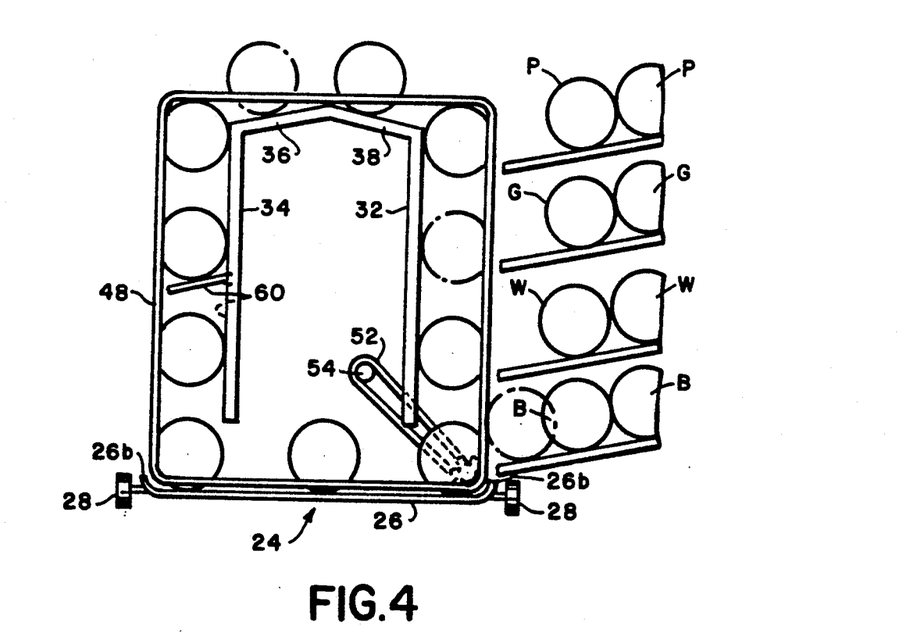
FIG. 4 is similar to FIG. 3 but shows a subsequent condition during a sorting and loading operation.

The drive is advantageously reversible for moving any selected bobbin bin or compartment into proximity with the desired discharge port 20 from either direction along the path. In FIG. 3, for example, if the color "P" represents purple, "G" green, "W" white and "B" black, it should be clear that the chain drive 48 can be moved in either direction to bring any desired compartment 30 into opposition, alignment or proximity with any desired rack 18. Once the compartment is juxtaposed with a rack, the associated gate 21 is actuated and a bobbin from that rack can be released and received within the compartment. For this purpose, the associated roller 50 should be sufficiently low in relation to the rack so that the bobbin can roll onto the roller, achieving a stable equilibrium upon contacting both the roller and the vertical guide 32. Referring to FIGS. 3 and 4, if black wire bearing bobbins are to be loaded in compartments 7 and 9, the drive can move the rollers in a clockwise direction one increment or position to bring compartment 7 into proximity with the lower most rack 18d. Once a "B" bobbin has been loaded into position 7, the drive can be actuated to rotate the chain drive in a counterclockwise direction by two positions or increments to bring compartment or holding bin 9 into opposition to the rack 18d and its associated discharge port 20. This procedure is continued until all of the positions 1-10 have been filled with bobbins, it being possible and in some cases likely that the same color or bobbin type will be loaded two or more times during one loading operation before the device is moved to the remote location for unloading or discharging the bobbins.

The bobbins generally define a width between their respective flanges upon which the bobbins can roll, as noted. Each holding bin or compartment 30 has a width greater than the width of the bobbin to permit a bobbin to roll in and roll out of the compartment bin with clearance.

Once the desired number of bobbins have been loaded onto the device 10, normally in all of the available compartments thereof, the carriage can be moved in any conventional manner to a remote location where the bobbins can be discharged or unloaded. An important feature of the present invention is the provision of means, such as the ejector platform 60 for sequentially ejecting a batch of bobbins from the holding compartments or bins. In this way, a batch of up to n bobbins, where n equaled the total number of bins or compartments available, can be dispensed in a desired sequence corresponding to the serial relationship of the compartments or bins independently of the manner in which the bobbins are initially placed into the individual ones of the compartments or bins 30.

As noted, the controller 56, with associated circuitry and hardware, is used to control the rotation of the drive chains and rollers 50. Such controller advantageously includes direction determining means for selecting the direction of movement along the path of the bobbins into proximity with desired discharge ports 20 which minimizes the distance traveled by a selected bobbin compartment or bin. This feature, described in connection with FIGS. 3 and 4, minimizes the time required to align bobbin compartments or bins and discharge ports for bobbin transfer. Such optimization of direction of movement of the drive chain can be manually selected by an operator. Alternately, where the apparatus is to be more fully automated, appropriated bobbin identification methods may be used for identifying the storage locations in which the specified bobbins are located. Such identification methods may include bar codes or other codes on the bobbins or on the storage racks on which the bobbins are supported for automatically determining the direction of movement of any given holding bin or compartment.

Having the capability of identifying which bobbins are in which storage racks, and being programmed or provided with input data for specifying which bobbins are to be placed within which bins or compartments, direction of movement determination can be made as a function of the initial positions of the specified bins or compartments and the final position to which it is to be moved for bobbin transfer.

Figure 5:
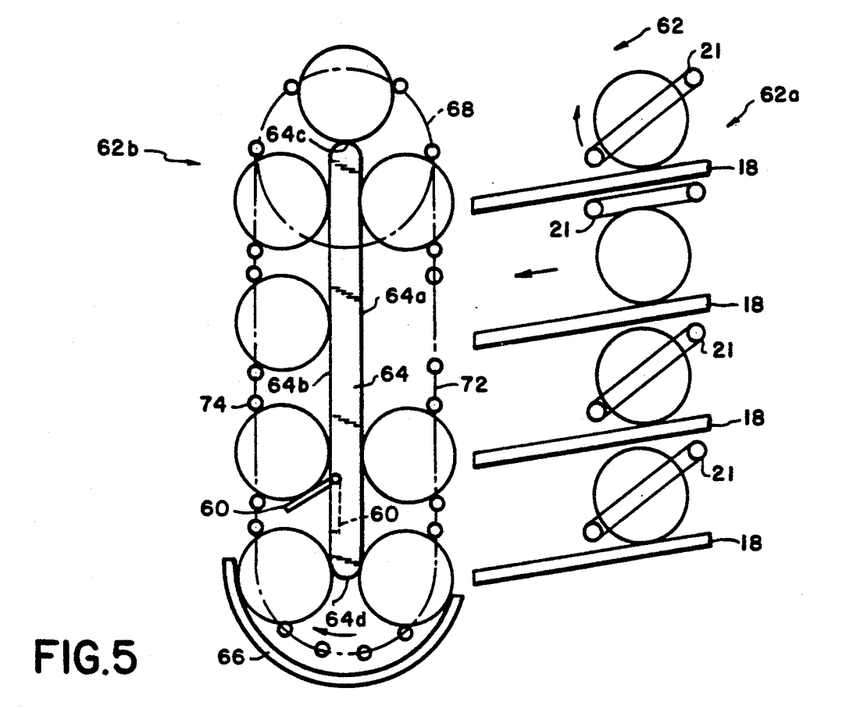
FIG. 5 is a schematic representation of another embodiment of the sorting apparatus, wherein the chain drive is mounted on large sprocket wheels at the top and bottom of a vertical guide member, the rollers maintaining the bobbins in place by urging same inwardly to roll against the vertical guide surfaces of the guide member.
Figure 6:
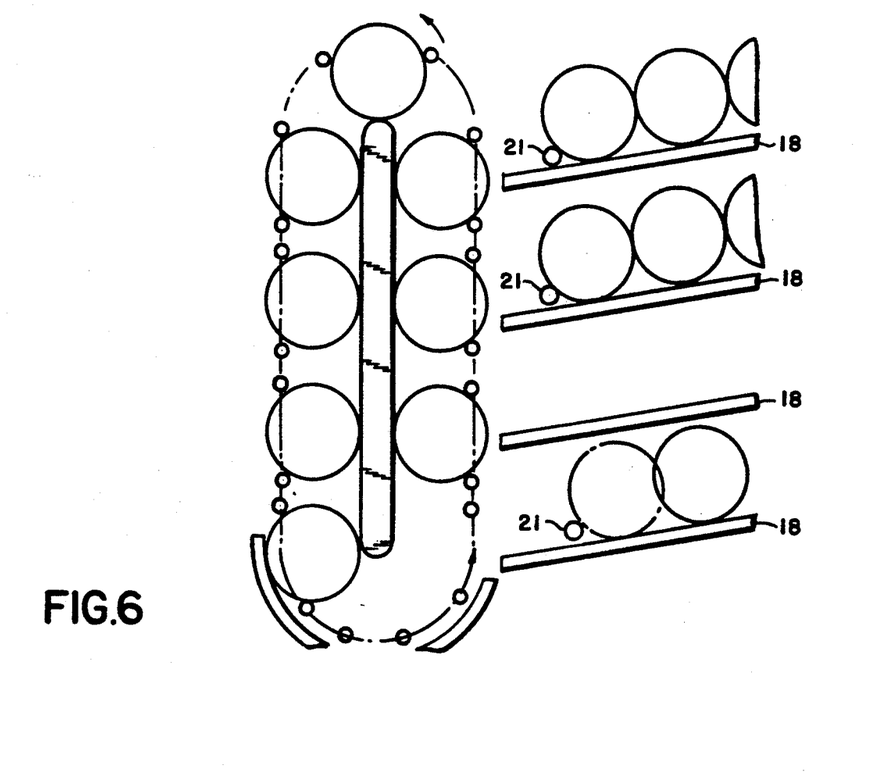
FIG. 6 is similar to FIG. 5, but showing another condition of loading of the apparatus.

Referring to FIGS. 5 and 6, another embodiment of the invention is shown and identified by the reference numeral 62. The embodiment is shown schematically and without a wheeled carriage. However, this embodiment as well as the one shown in FIGS. 7 and 8 all include wheeled carriages or other means for transporting the device between remote loading and unloading stations.

In FIGS. 5 and 6, the bobbins are guided by means of a vertical member 64 having two opposing vertical guide surfaces 64a, 64b spaced from each other in the vertical plane. An upper arcuate guide surface 64c bridges the upper ends of the vertical guide surfaces 64a,64b, and a lower guide surface 66 is spaced below the vertical member 64. Here, the drive mechanism includes upper and lower sprocket wheels 68,70, respectively mounted for rotation at the upper and lower ends of the vertical member 64 about rotation points proximate to the upper and lower ends 64c,64d. A chain drive 72 cooperates with the sprocket wheels 68,70 to configure arcuate portions of the path at the upper and lower ends of the vertical member 64 as shown. The lower guide 66 is arcuate and generally conforms to the lower arcuate portion at the lower end of the closed loop path and is spaced below the vertical member 64 to permit bobbins to move on the lower guide 66 below the vertical member 64 as the bobbins move along the closed loop path.

As with the planetary arrangement of FIGS. 1-4, the diameters of the sprocket wheels 68,70 are selected so that the chain 72 and the rollers 74 carried by the chains are spaced from the guide surfaces 64a,64b a distance greater than one half of the diameter of the bobbins but less than the diameter of the bobbins, so that the bobbins are in a stable equilibrium and urged by the rollers to roll against the vertical guide surfaces 64a,64b. The rollers in this embodiment, as with the other embodiments, control the transition movements of the bobbins at the upper and lower ends of the vertical guides by controlling the descent of the bobbins once they pass the peaks at the top of the guides. Similarly, at the lower ends of the guides, the rollers simply force the bobbins to move along the path although the bobbins are primarily supported by the lower arcuate guide surfaces.

At the loading side 62a in FIG. 5, the gates 21 are schematically shown as gates which may be pivotally mounted as shown, which can be raised to permit a selected bobbin to enter a holding bin or compartment 30. At the unloading side 62b, the bobbins can be ejected in a manner similar to that described in connection with FIGS. 1-4, except that the ejector platform 60 is here mounted within the vertical member 64 and can be pivoted to extend into the path of the bobbins, urging successive bobbins to be lifted off the rollers which supports them thereby ejecting them onto an appropriate chute or other bobbin handling machine.

Figure 7:
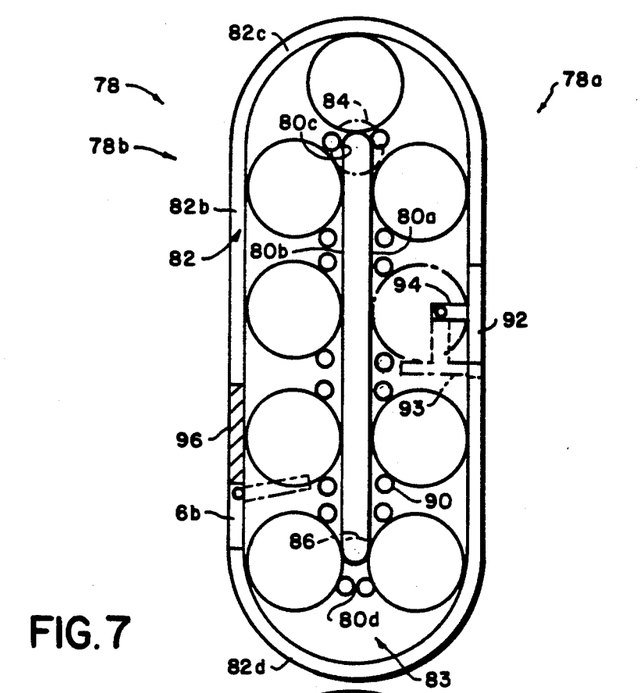
FIG. 7 is a further embodiment of the sorting and batch transfer apparatus, wherein internal and external guide members are provided which together define a channel through which the bobbins are moved, and in which covers or doors in the external guide member are provided which can be selectively moved to provide access to the internal guide channel to selected bobbins from storage racks (not shown)
Figure 8:
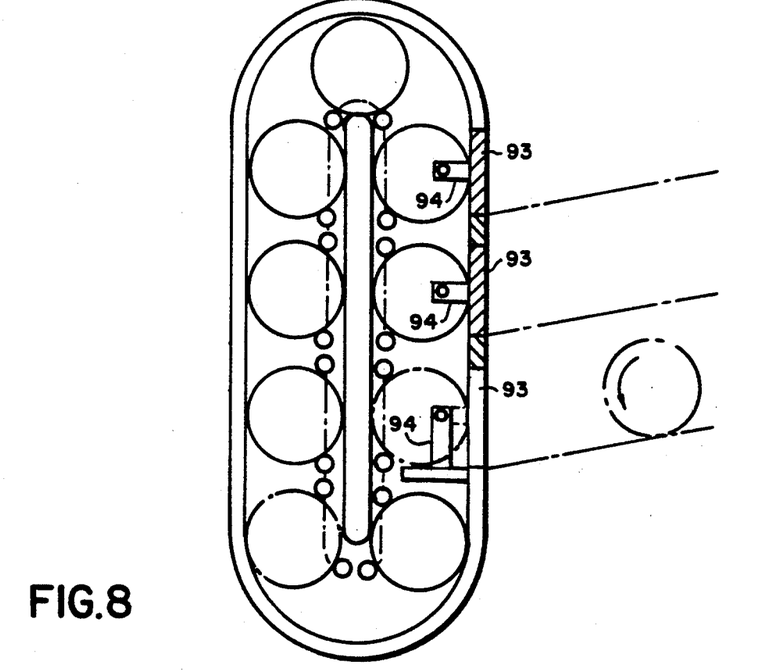
FIG. 8 is similar to FIG. 7 but showing apparatus in another condition wherein a bobbin is about to be loaded through an open cover or door.

In FIGS. 7 and 8, a further embodiment is shown which is designated by the reference numeral 78. Here, the guides for the bobbins include an internal vertical member 80 which has two opposite vertical guide surfaces 80a,80b spaced from each other in the vertical plane. Upper and lower guide surfaces 80c,80d respectively bridge the upper and lower ends of the vertical guide surfaces.

An external guide 82 encloses the internal member 80 and has an internal surface spaced from and substantially conforms to the guide surfaces 80a-80d of the internal member 80 to form a closed channel 83 about the periphery of the internal member 80 which has a width in the vertical plane at least equal to the diameter of the flanges 12b. In this embodiment, the drive can include smaller sprocket wheels 84,86 mounted for rotation in the upper and lower ends 80c,80d, respectively of the internal vertical member 80 about rotation points proximate to the upper and lower ends. A chain drive 88 cooperates with the sprocket wheels 84,86 to configure arcuate portions of the path at the upper and lower ends of the internal vertical member 80. While the rollers in the previously discussed embodiments 10 and 62 were spaced distances from the vertical guide surfaces greater than the radius but less than the diameter of the bobbin flanges, the rollers in the instant embodiment are arranged very close to the guide surfaces defined by the internal vertical member 80 to urge the bobbins to roll about the rollers and the internal surface of the external guide member 82 substantially about the entire closed loop path.

Because the inside surface of the external guide member 82 serves as a rolling surface for the bobbins, the external guide member 82 is provided with a plurality of openings 92 (FIG. 7) vertically aligned along the vertical portions of the closed path and covers or doors 93 are provided which are mounted for movement between open and closed positions to allow a bobbin to move into or out of a respective holding bin or compartment 30 when the cover is open and for providing the necessary guide surfaces and preventing inadvertent release of a bobbin from a compartment or bin when the cover is closed. The specific manner in which the doors or covers are mounted is not critical, and may be pivotally mounted on suitable brackets 94 which may be manually or automatically opened. With this configuration, only the door or cover 93 which is associated with a holding bin or compartment to which access must be obtained is opened. All the other remaining doors or covers are maintained closed for the reasons aforementioned.

When the device 78 is moved to the remote unloading position and the bobbins are to be discharged, an exit door or opening 96 is provided which can be opened manually or automatically and an ejection device 60 (FIG. 7) may be provided within the external vertical member 82 which swings into the closed loop path to raise the bobbins and assist them in rolling out of the opening 96 at the discharge end. However, since the bobbins are urged against and roll against the interior surface of the external guide member, the bobbins need to be minimally assisted in being released from the channel and onto the discharge chute (not shown).

Each of the embodiments described has ten holding bin or compartments. To load 50 bobbins to 25 twinners, for example, it is possible with the present invention to quickly and efficiently pick up bobbins on the sorting device and make only five trips back and forth between the storage racks and the discharge chute for the twinners. In this case, it is possible to change as many as 100 bobbins in a matter of 15 minutes or less. While the machines are running, all of the bobbins can be prepared and the loading can take place with minimal down time. While it may be necessary for the sorting device to register with more than one column of stacked storage racks, the sorting time can even be decreased somewhat where the same color coded wires or wire types are needed to form a single batch of bobbins to be ejected. By providing the reversible drive, and the direction of movement optimization capability, random selection is significantly enhanced.

As indicated, while the description has been in connection with storage racks four rows high, it is currently the intention to go five high and five across in width. Therefore, for ten different colors for one cable, it is possible to obtain these from two vertical rows. The device, however, is extremely versatile and flexible in that it can be designed to accommodate any combination of rows and columns of stacked storage racks.

Also, while the embodiments have been described in terms of single rollers having the width of the bobbins, the rollers can be made wider so that two, three or any number of bobbins can be loaded, simultaneously or individually, onto any one roller. Therefore, if it is desired to load 20 bobbins instead of 10, the rollers can be made twice as wide and, of course, it would be repositioned lengthwise. However, the capacity of the device can be increased without sacrificing the versatility and the primary advantages of the invention.

Since the bobbins in the first two embodiments 10 and 62 tend to urge the rollers outwardly, they are advantageously provided suitable rigid retaining bars or members (not shown) which prevent bowing of the vertical chain drive sections and to maintain these substantially parallel to the vertical guide surfaces. In this way, the spacing or the distance between the vertical guide surfaces and the rollers are maintained substantially constant throughout the travel along the vertical guide surfaces.

The preferred embodiment of the invention has been illustrated and described, but changes and modifications can be made and some features can be used in different combinations without departing from the invention as defined in the claims.

I claim:

1. Bobbin sorting and batch transfer apparatus for collecting a predetermined number of bobbins from a loading station having a plurality of storage locations arranged along a predetermined direction and each containing bobbins wound with wires having specified physical characteristics and each having a discharge port, and for discharging the collected bobbins in a predetermined sequence at an unloading station remote from the loading station, the apparatus comprising carriage means for moving between the loading and unloading stations; a plurality of serially arranged bobbin holding means 1 . . . n each mounted on said carriage means for movement along a closed path at least a portion of which is substantially parallel to said predetermined direction and for registry with any desired storage location when said carriage means is at the loading station and for receiving a single selected bobbin; gate means for enabling a single bobbin stored in a specified storage location and having a desired specified characteristic to be moved to a selected empty holding means $n_i$ in registry therewith; control and drive means for selectively positioning any bobbin holding means $n_i$ in registry with a desired discharge port of any storage location to thereby permit any assortment of up to n bobbins in any combination each to be independently and individually loaded into another selected bobbin holding means in any desired order, said bobbin holding, gate, control and drive means comprising sorting means thereby permitting the sorting of bobbins relative to each other within successive bobbin holding means to arrange the bobbin in a desired sequence relative to each other; and ejecting means for sequentially ejecting a bobbin from each of a plurality of sequentially arranged holding means 1 . . . n, whereby a batch of up to n bobbins can be dispensed in the desired sequence corresponding to a serial relationship of said holding means 1 . . . n independently of the manner in which the bobbins are initially placed into the individual ones of said holding means.

2. Apparatus as defined in claim 1, wherein the bobbin storage locations are arranged in vertical columns within which the discharge ports are spaced a predetermined distance from each other, and wherein said holding means are spaced from each other along said path a distance which substantially corresponds to the predetermined distance of the discharge ports, whereby alignment of a holding means with a discharge port in one vertical column causes a plurality of holding means to be aligned with a like plurality of discharge ports in that column.

3. Apparatus as defined in claim 2, wherein the bobbins have a width defined by flanges upon which the bobbins can roll, each holding means having a width greater than the width of a bobbin to permit a bobbin to roll in and roll out of a bobbin holding means.

4. Apparatus as defined in claim 3, wherein said carriage means includes drive means for selectively driving said carriage to bring a column of holding means into alignment with one of the vertical columns of discharge ports, whereby after all the bobbins have been loaded from one column said carriage can be moved to other columns for selection of bobbins until all said holding means 1 ... n have been loaded.

5. Apparatus as defined in claim 1, wherein said holding means are arranged in a planetary configuration.

6. Apparatus as defined in claim 1, wherein said carriage means includes guide means for forming a closed loop path in a generally vertical plane, bobbins placed in said holding means abutting against and rolling on said guide means as the bobbins move along said closed loop path, said holding means including bobbin support means for maintaining bobbins received within said holding means spaced from each other along said closed loop path predetermined minimum distances from each other.

7. Apparatus as defined in claim 6, wherein said control means includes drive means for advancing said support means along said closed loop path and urging bobbins within said holding means to follow said closed loop path.

8. Apparatus as defined in claim 7, wherein said guide means comprises two vertical guides spaced from each other in said vertical plane, inclined guides extending upwardly from each vertical guide meeting substantially midway between said vertical guides to bridge the same and provide an initial gradual incline and subsequently a gradual decline for a bobbin when moving from one vertical guide to the other vertical guide; and a lower guide spaced below said vertical guides, said drive means comprising a chain drive which follows said closed loop path, and sad support means comprising rollers mounted on said chain drive.

9. Apparatus as defined in claim 8, wherein said drive means comprises a plurality of sprockets arranged about said closed loop path to configure said chain drive into four portions including two substantially vertical chain portions and two horizontal chain portions, said vertical chain portions being spaced from associated vertical guides and said horizontal chain portions being above and proximate to said inclined and lower guides.

10. Apparatus as defined in claim 9, wherein said vertical chain portions are spaced from said vertical guides a distance to insure that bobbins supported by said rollers opposite said vertical guides are stable and urged by said rollers to roll against said vertical guides.

11. Apparatus as defined in claim 8, wherein said spacing between vertical guides and said lower guide is sufficient to permit bobbins to move on said lower guide below said vertical guides as the bobbins move along said closed loop path.

12. Apparatus as defined in claim 8, wherein said guides are configurated to insure that the bobbins always roll against at least one of said guides.

13. Apparatus as defined in claim 7, wherein said guide means comprises a vertical member having two opposing vertical guide surfaces spaced from each other in said vertical plane and having upper and lower ends, an upper arcuate guide surface bridging the upper ends of said vertical guide surfaces, and a lower guide surface spaced below said vertical member, said drive means comprising sprocket wheels mounted for rotation at said upper and lower ends of said vertical guide surfaces about rotation points proximate to said upper and lower ends of said vertical guide surfaces, and a chain drive cooperating with said sprocket wheels to configure arcuate portions of said path at said upper and lower ends of said vertical member, said lower guide surface generally conforming to said lower arcuate portion of said path and being spaced below said vertical member to permit bobbins to move on said lower guide surface below said vertical member as the bobbins move along said closed loop path.

14. Apparatus as claimed in claim 13, wherein said support means comprises rollers mounted on said chain drive which follows and is spaced from said guide surfaces to insure that bobbins supported by said rollers opposite said vertical guide surfaces are stable and urged by said rollers to roll against said vertical guide surfaces.

15. Apparatus as defined in claim 7, wherein said guide means comprises an internal vertical member having two opposing vertical guide surfaces spaced from each other in said vertical plane, upper and lower guide surfaces respectively bridging upper and lower ends of said vertical guide surfaces, and an external member enclosing said internal member and having an internal surface spaced from and substantially conforming to said guide surfaces on said internal member to form a closed channel about a periphery of said internal member having a width in said vertical plane at least equal to a diameter of flanges of the bobbins whereby the bobbins can roll in on their flanges along a direction in the vertical plane into and out of said bobbin holding means, said drive means comprising sprocket wheels mounted for rotation at the upper and lower ends of said internal vertical member about rotation points proximate to said upper and lower ends, and a chain drive cooperating with said sprocket wheels to configure arcuate portions of said path at the upper and lower ends of said internal vertical member, said external member being provided with a plurality of openings vertically aligned along said path, and cover means mounted for selectively opening said covers only when a bobbin is to pass through a selected opening, and for otherwise closing associated openings and serving as part of said guide means along which the bobbins roll during movement along said path.

16. Apparatus as defined in claim 15, wherein said support means comprises rollers mounted chain drive which is arranged to urge the bobbins to roll about said rollers and said internal surface of said external member substantially about the entire closed loop path.

17. Apparatus as defined in claim 1, wherein said control means includes reversible drive means for moving any selected bobbin holding means into proximity with a desired discharge port from either direction along said path.

18. Apparatus as defined in claim 17, wherein said control means includes direction determining means for selecting a direction of movement along said path of a selected bobbin holding means into proximity with a desired discharge port which minimizes travel by a selected bobbin holding means thereby minimizing time required to align bobbin holding means and discharge ports for bobbin transfer.

19. Apparatus as defined in claim 18, wherein said direction determining means comprise a manually operated drive controller.

20. Apparatus as defined in claim 18, further comprising bobbin identifying means for identifying the storage locations in which specified bobbins are located; and automatic direction determining means for determining the direction of movement of a specified holding means by identification of the storage locations and as a function of an initial position of the specified holding means and a final position to which it is to be moved for bobbin transfer.

21. Apparatus as defined in claim 1, wherein said predetermined direction is substantially vertical.

* * * * *